US008643791B2

(12) United States Patent
Sato

(10) Patent No.: US 8,643,791 B2

(45) Date of Patent: Feb. 4, 2014

(54) INFORMATION COMMUNICATION SYSTEM, INFORMATION PROCESSING APPARATUS, INFORMATION COMMUNICATION PROGRAM, AND INFORMATION COMMUNICATION METHOD

(75) Inventor: Masahiko Sato, Tokyo (JP)

(73) Assignee: Sony Corporation (JP)

( * ) Notice: Subject to any disclaimer, the term of this patent is extended or adjusted under 35 U.S.C. 154(b) by 362 days.

(21) Appl. No.: 12/798,199

(22) Filed: Mar. 31, 2010

(65) Prior Publication Data

US 2010/0268810 A1 Oct. 21, 2010

(30) Foreign Application Priority Data

Apr. 15, 2009 (JP) ............................... P2009-098614

(51) Int. Cl.
*H04N 5/44* (2011.01)

(52) U.S. Cl.
USPC ..................... 348/734; 340/12.52; 340/12.53; 340/12.3; 725/81; 348/552; 348/564

(58) Field of Classification Search
USPC ......... 348/734, 569, 570, 705, 706, 552, 553, 348/584–589, 563–567; 725/78–85; 340/539.1, 539.11, 12.22, 12.3, 12.5, 340/12.52, 12.53, 12.54; 715/793
See application file for complete search history.

(56) References Cited

U.S. PATENT DOCUMENTS

| | | | | |
|---|---|---|---|---|
| 7,224,903 B2 * | 5/2007 | Colmenarez et al. | ......... | 398/106 |
| 8,054,294 B2 * | 11/2011 | Sakai et al. | .................. | 345/169 |
| 8,198,988 B2 * | 6/2012 | Hardacker et al. | ......... | 340/12.51 |
| 2007/0130626 A1 * | 6/2007 | Kato et al. | ...................... | 726/27 |
| 2009/0290072 A1 * | 11/2009 | Lee | .............................. | 348/734 |
| 2010/0199306 A1 * | 8/2010 | Colter et al. | .................... | 725/38 |

FOREIGN PATENT DOCUMENTS

| | | |
|---|---|---|
| JP | 2005-303423 A | 10/2005 |
| JP | 2006-279424 A | 10/2006 |

* cited by examiner

*Primary Examiner* — Michael Lee

(74) *Attorney, Agent, or Firm* — Lerner, David, Littenberg, Krumholz & Mentlik, LLP

(57) ABSTRACT

An information communication system includes: a communication line which connects a first information processing apparatus and a second information processing apparatus to each other; a transmission unit which is included in the first information processing apparatus and transmits identity information of the first information processing apparatus without passing through the communication line; a reception unit which is included in the second information processing apparatus and receives the identity information of the first information processing apparatus transmitted from the transmission unit without passing through the communication line; and an information transmission unit which is included in the second information processing apparatus and transmits information to the first information processing apparatus via the communication line by using the identity information received by the reception unit.

7 Claims, 12 Drawing Sheets

FIG. 6

IDENTITY INFORMATION (model name) → <modelName>model name</modelName>

IDENTITY INFORMATION (uuid) → <UDN>uuid:UUID</UDN>

```
<?xml version="1.0"?>
<root xmlns="urn:schemas-upnp-org:device-1-0">
 <specVersion>
  <major>1</major>
  <minor>0</minor>
 </specVersion>
 <URLBase>base URL for all relative URLs</URLBase>
 <device>
  <deviceType>urn:schemas-upnp-org:device:Basic:1</deviceType>
  <friendlyName>short user-friendly title</friendlyName>
  <manufacturer>manufacturer name</manufacturer>
  <manufacturerURL>URL to manufacturer site</manufacturerURL>
  <modelDescription>long user-friendly title</modelDescription>
  <modelName>model name</modelName>
  <modelNumber>model number</modelNumber>
  <modelURL>URL to model site</modelURL>
  <serialNumber>manufacturer's serial number</serialNumber>
  <UDN>uuid:UUID</UDN>
  <UPC>Universal Product Code</UPC>
  <iconList>
   <icon>
    <mimetype>image/format</mimetype>
    <width>horizontal pixels</width>
    <height>vertical pixels</height>
    <depth>color depth</depth>
    <url>URL to icon</url>
   </icon>
   XML to declare other icons, if any, go here
  </iconList>
  <presentationURL>URL for presentation</presentationURL>
 </device>
</root>
```

INFORMATION COMMUNICATION SYSTEM, INFORMATION PROCESSING APPARATUS, INFORMATION COMMUNICATION PROGRAM, AND INFORMATION COMMUNICATION METHOD

CROSS-REFERENCE TO RELATED APPLICATION

The present application claims priority from Japanese Patent Application No. JP 2009-098614 filed in the Japanese Patent Office on Apr. 15, 2009, the entire content of which is incorporated herein by reference.

BACKGROUND OF THE INVENTION

1. Field of the Invention

The present invention relates to an information communication system, an information processing apparatus, an information communication program, and an information communication method, and more particularly, to an information communication system, an information processing apparatus, an information communication program, and an information communication method capable of carrying out information communication by use of identity information between information processing apparatuses connected to each other via a communication line.

2. Description of the Related Art

A remote controller remotely operating an information processing apparatus such as a television or an image recording apparatus transmits a control signal to an information processing apparatus, which is an operation target, by use of a communication method such as an infrared ray. Here, Japanese Unexamined Patent Application Publication No. 2005-303423 discloses a technique changing the operation target in accordance with the direction of an information processing apparatus.

In recent years, there has been suggested a system controlling an apparatus from a remote controller connected via a communication line such as a home network configured wirelessly. Japanese Unexamined Patent Application Publication No. 2006-279424 discloses a technique for supplying a user with selection information used to select a control target apparatus on the basis of a distance between a remote controller and an apparatus and selecting the control target apparatus in response to the user's selection of the selection information.

SUMMARY OF THE INVENTION

However, when an apparatus is controlled from a remote controller via a communication line such as a home network configured wirelessly, it is difficult to determine which apparatus is a target to be controlled from the remote controller. For example, when an apparatus is installed in another room, a problem may arise in that the remote controller may not determine a room where the remote controller is used and a user may not accurately determine an apparatus which the user desires to operate.

It is desirable to provide a system capable of accurately determining a control target apparatus connected to a communication line.

According to an embodiment of the invention, there is provided an information communication system including: a communication line which connects a first information processing apparatus and a second information processing apparatus to each other; a transmission unit which is included in the first information processing apparatus and transmits identity information of the first information processing apparatus without passing through the communication line; a reception unit which is included in the second information processing apparatus and receives the identity information of the first information processing apparatus transmitted from the transmission unit without passing through the communication line; and an information transmission unit which is included in the second information processing apparatus and transmits information to the first information processing apparatus via the communication line by using the identity information received by the reception unit.

According to the embodiment of the invention, the identity information is transmitted from the first information processing apparatus to the second information processing apparatus without passing through the communication line. On the other hand, the second information processing apparatus receives the identity information of the first information processing apparatus without passing through the communication line. With such a configuration, the second information processing apparatus can determine the destination of information from the identity information received without passing through the communication line.

According to an embodiment of the invention, there is provided an information processing apparatus including: a reception unit which receives identity information of another information processing apparatus transmitted from the another information processing apparatus connected via a communication line without passing through the communication line; and an information transmission unit which transmits information to the another information processing apparatus via the communication line by using the identity information received by the reception unit.

According to the embodiment of the invention, it is possible to determine the destination of the information from the identity information by receiving the identity information of the another information processing apparatus transmitted from the another information processing apparatus without passing through the communication line.

According to an embodiment of the invention, there is provided an information processing apparatus including: a transmission unit which transmits identity information of the information processing apparatus to another information processing apparatus connected via a communication line without passing through the communication line; and an information transceiver which transmits information to the another information processing apparatus via the communication line and receives information transmitted from the another information processing apparatus via the communication line.

According to the embodiment of the invention, since the identity information of the information processing apparatus is transmitted without passing through the communication line, it is possible to directly transmit the identity information of the information processing apparatus to the another information processing apparatus connected via the communication line.

According to an embodiment of the invention, there is provided an information communication program causing a computer to execute: transmitting step of permitting a first information processing apparatus connected via a communication line to transmit identity information of the first information processing apparatus without passing through the communication line; a receiving step of permitting a second information processing apparatus connected via the communication line to receive the identity information transmitted from the first information processing apparatus in the transmitting step without passing through the communication line; and an information transmitting step of transmitting information to the first information processing apparatus via the communication line by using the identity information received in the receiving step.

According to the embodiment of the invention, the identity information is transmitted from the first information processing apparatus to the second information processing apparatus without passing through the communication line. On the other hand, the second information processing apparatus receives the identity information of the first information processing apparatus without passing through the communication line. With such a configuration, the second information processing apparatus can determine the destination of information from the identity information received without passing through the communication line.

According to an embodiment of the invention, there is provided an information communication method including the steps of: transmitting identity information of a first information processing apparatus from a transmission unit of the first information processing apparatus connected to a communication line without passing through the communication line; receiving the identity information transmitted from the transmission unit of the first information processing apparatus without passing through the communication line by a reception unit of a second information processing apparatus; and transmitting information from an information transmitting unit of the second information processing apparatus to the first information processing apparatus via the communication line by using the identity information received by the reception unit of the second information processing apparatus.

According to the embodiment of the invention, the identity information is transmitted from the transmitting unit of the first information processing apparatus to the second information processing apparatus without passing through the communication line. On the other hand, the reception unit of the second information processing apparatus receives the identity information of the first information processing apparatus without passing through the communication line. With such a configuration, the second information processing apparatus can determine the destination of information from the identity information received without passing through the communication line.

For example, the first information processing apparatus is an electronic apparatus such as a television. The second information processing is a remote controller. The communication line is the LAN (Local Area Network) such as a home network configured wirelessly. A communication medium transmitting the identity information from the first information processing apparatus to the second information processing apparatus includes an infrared ray or a sound.

According to the embodiments of the invention, since the identity information of the first information processing apparatus can be transmitted to the second information processing apparatus without passing through the communication line, the first information processing apparatus can be specified exactly. Accordingly, even when the second information processing apparatus which is the remote controller is moved, a desired apparatus can be operated without a complex operation.

BRIEF DESCRIPTION OF THE DRAWINGS

FIG. 6 is a diagram illustrating an example of section 3 of a basic device.

DESCRIPTION OF THE PREFERRED EMBODIMENTS

Hereinafter, preferred embodiments of the invention (hereinafter, referred to as "embodiments") will be described. The description of the embodiments will be made in the following order.

1. Information Communication System according to Embodiment (Overall Configuration and Configuration Example according to Comparative Example)

2. Information Processing Apparatus according to Embodiment (Examples of First and Second Information Processing Apparatuses)

3. Information Communication Method (Flow of Communication Method and Specific Example)

4. Information Communication Program (Program Examples of First and Second Information Processing Apparatuses)

5. Screen Display Examples (Screen Display Examples 1 to 3)

Figure 1:
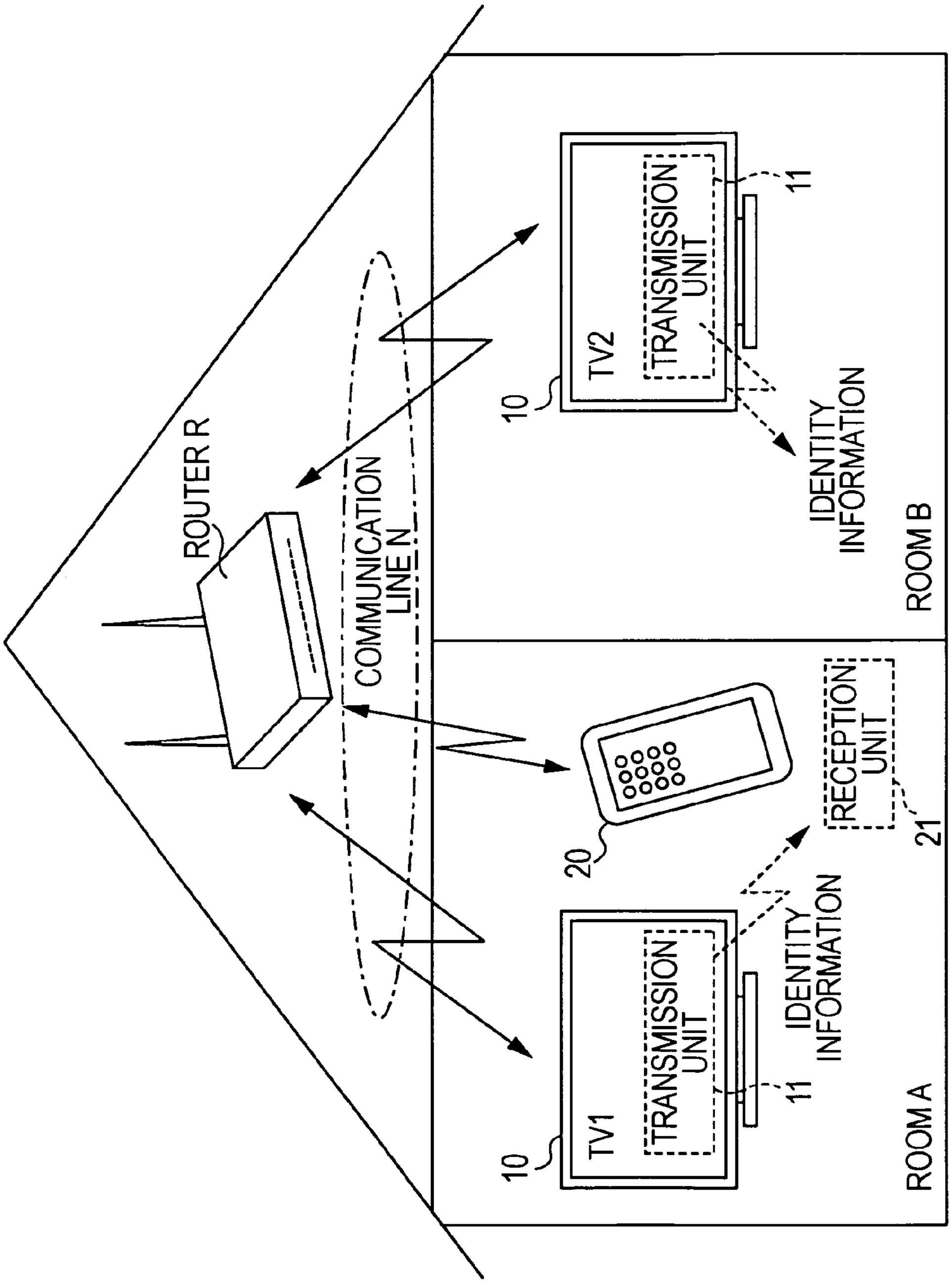
FIG. 1 is a diagram illustrating the overall configuration of an information communication system according to an embodiment.

1. Information Communication System According to Embodiment Overall Configuration of Information Communication System FIG. 1 is a diagram illustrating the overall configuration of an information communication system according to an embodiment. The information communication system according to this embodiment includes a communication line N, an electronic apparatus (first information processing apparatus 10), and a remote controller (second information processing apparatus 20).

The communication line N is a network such as the LAN (Local Area Network) processed by a router R. For example, a home network using wireless communication is applied thereto.

The electronic apparatus (the first information processing apparatus 10) is an apparatus, such as a television, an image record reproducing apparatus, an audio apparatus, or a personal computer, processing predetermined information. In this embodiment, for easy description, a television is used as the electronic apparatus (the first information processing apparatus 10).

The television is connected to the communication line N. In this embodiment, Television TV1 installed in Room A and Television TV2 installed in Room B are connected to the communication line N wirelessly. Since Television TV1 and Television TV2 each have an information transceiver, Television TV1 and Television TV2 transmit and receive information to and from another apparatus via the communication line N.

The remote controller (the second information processing apparatus 20) is connected to the communication line N wirelessly. Since the remote controller has an information transceiver, the remote controller operates the electronic apparatus (the first information processing apparatus 10) remotely via the communication line N or receives, processes, and displays information (reply information, text information, image information, etc.) transmitted from the electronic apparatus via the communication line N.

In the information communication system according to this embodiment Television TV1 and Television TV2, which are the electronic apparatus (the first information processing apparatus 10), each include a transmission unit 11 which transmits identity information of the electronic apparatus via the communication line N. The remote controller (the second information processing apparatus 20) includes a reception unit receiving the identity information transmitted from the transmission unit 11 of the electronic apparatus via the communication line N. That is, the remote controller (the second information processing apparatus 20) directly receives the identity information from the electronic apparatus (the first information processing apparatus 10).

A transmission range in which the transmission unit of the electronic apparatus transmits the identity information is narrower than a transmission range of radio communication connected with the communication line N. For example, the electronic apparatus has the transmission range from several meters to several tens of meters and may have directionality, as necessary. Therefore, the remote controller receives the identity information from only the electronic apparatus in the range of directly receiving the identity information among electronic apparatuses connected to the communication line N. Accordingly, the remote controller uses the identity information of the electronic apparatus in the range of directly receiving the identity information. The remote controller transmits and receives information to and from the electronic apparatus via the communication line N by using the identity information as the destination.

Overall Configuration According to Comparative Example

Figure 2:
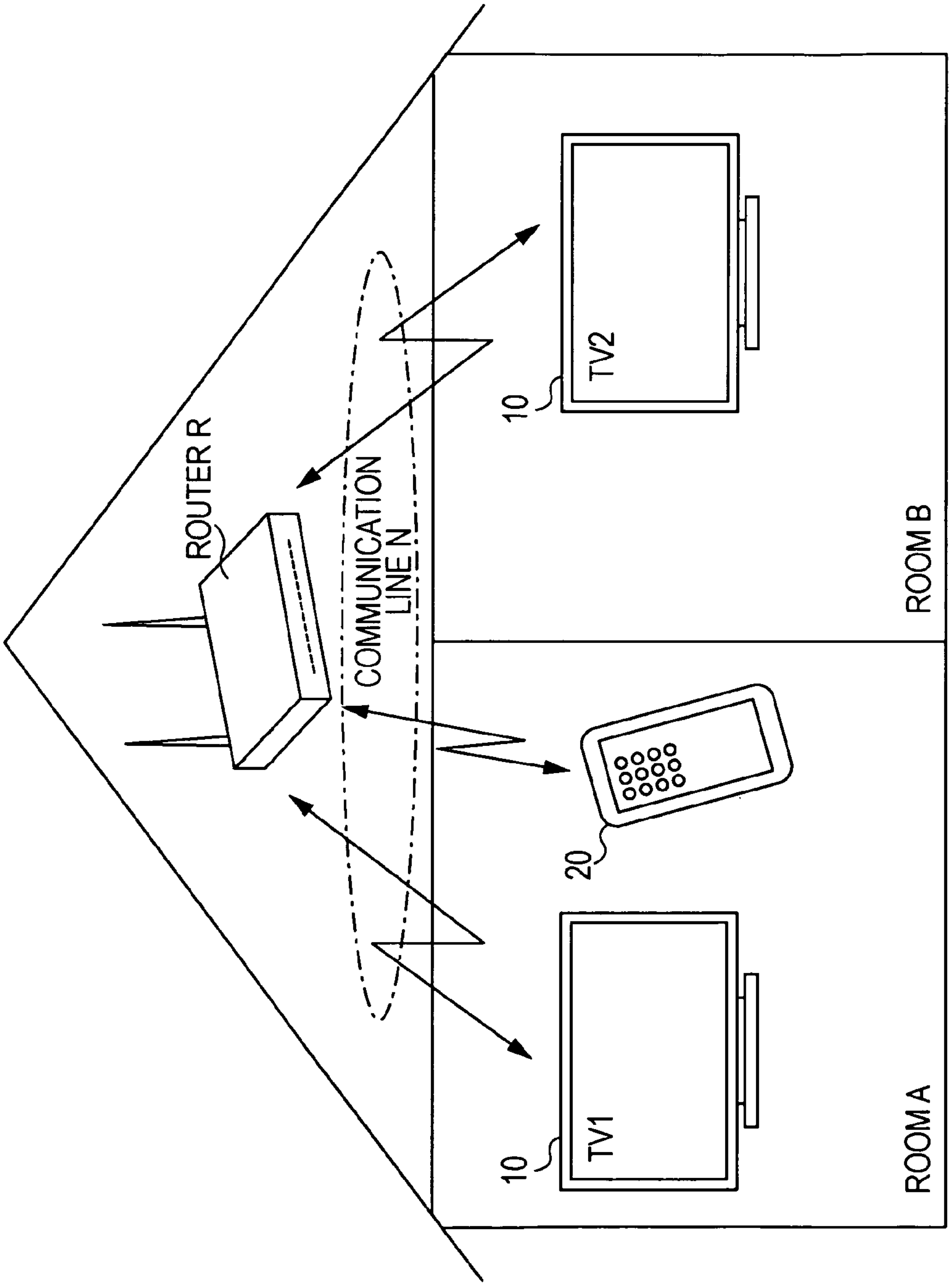
FIG. 2 is a diagram illustrating the overall configuration of an information communication system according to a comparative example.

Hereinafter, an information communication system according to a comparative example will be described. FIG. 2 is a diagram illustrating the overall configuration of the information communication system according to the comparative example. As in the embodiment, the information communication system according to the comparative example includes a communication line N, an electronic apparatus (first information processing apparatus 10), and a remote controller (second information process apparatus 20). In the information communication system according to the comparative example, when the remote controller is connected to the communication line N, the remote controller recognizes electronic apparatuses (for example, Television TV1 and Television TV2) connected to the same communication line N. Then, the remote controller remotely transmits a signal to a desired electronic apparatus.

Here, FIG. 2 shows a home network in which the physical layer of the communication line N is wirelessly configured. When the remote controller is used in either Room A or Room B, it is difficult to determine whether the remote controller is used in effect in Room A or Room B. Therefore, it is not clear whether a control target of the remote controller is Television TV1 or Television TV2. In order to avoid this problem, it can be considered to form a selection menu for Television TV1/TV2 in the remote controller, for example. However, this method is troublesome to operate.

In the information communication system according to the embodiment, in order to solve this problem, Television TV1 and Television TV2 serving as the first information apparatus transmit the identity information of Television TV1 and Television TV2 via the communication line N. When the identity information is received, it is automatically determined whether the remote controller serving as the second information processing apparatus 20 is located in the vicinity of Television TV1 or in the vicinity of Television TV2. When the remote controller is located in Room A, Television TV1 is the control target. Alternatively, when the remote controller is located in Room B, Television TV2 is the control target. In this way, automatic conversion is carried out.

Figure 3:
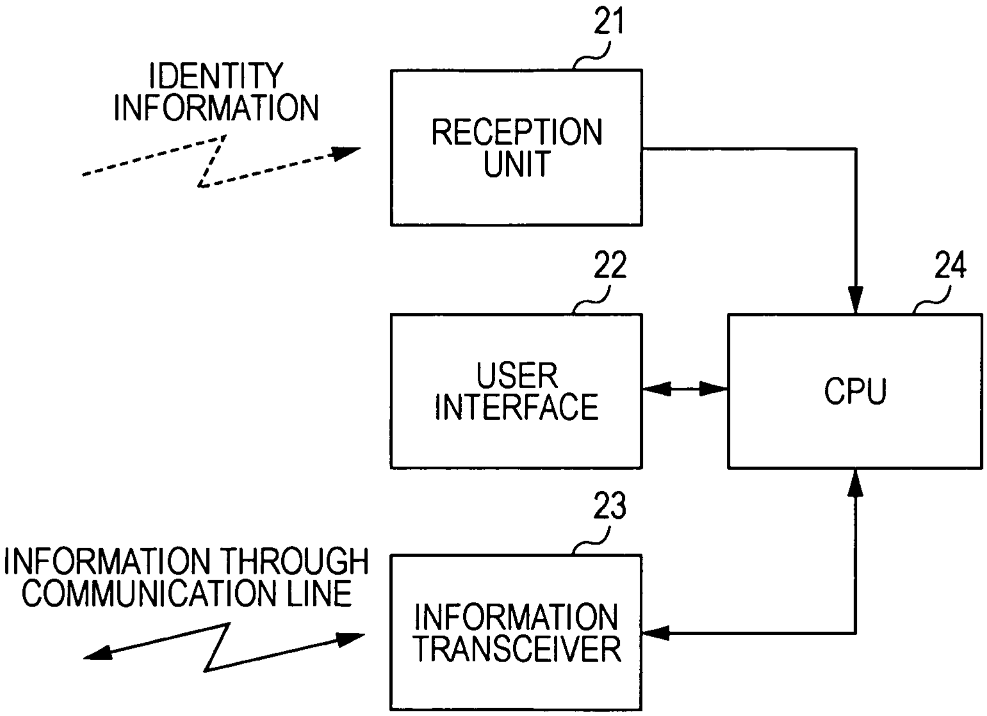
FIG. 3 is a block diagram illustrating an exemplary configuration of a second information processing apparatus serving as a remote controller.

2. Information Processing Apparatus According to Embodiment Remote Controller: Second Information Processing Apparatus FIG. 3 is a block diagram illustrating an exemplary configuration of the second information processing apparatus serving as the remote controller. As shown in FIG. 3, the second information processing apparatus includes a reception unit 21, a user interface 22, an information transceiver 23, and a CPU (Central Processing Unit) 24.

The reception unit 21 is a unit which receives identity information transmitted from the first information processing apparatus which is an electronic apparatus. The identity information transmitted from the first information processing apparatus is transmitted through a communication medium such as an infrared ray, a sound, a weak radio wave, or the like. Accordingly, the reception unit 21 has a configuration corresponding to the communication medium through which the identity information is transmitted. For example, when the infrared ray is used, the reception unit 21 is configured as an infrared receiver. When the sound is used, the reception unit 21 is configured as a microphone. When the weak radio wave is used, the reception unit 21 is configured as an RF receiver. The identity information received by the reception unit 21 is sent to the CPU 24.

The user interface 22 is configured by operation buttons (hardware buttons) or a touch panel display. Operation buttons (software buttons) or an interface configured for an operation designation of a slide bar is displayed on the touch panel display. Moreover, the user interface includes a display section configured to display various kinds of information such as a text or an image. The display of the user interface 22 is switched under the control of the CPU 24. An instruction of a user received through the user interface 22 is sent to the CPU 24.

The information transceiver 23 is a unit which transmits and receives information to and from another apparatus via the communication line. The information transceiver 23 transmits and receives information wirelessly, for example. The instruction of a user received through the user interface 22 is sent to the information transceiver 23 via the CPU 24. The instruction is transmitted from the information transceiver 23 to the communication line wirelessly, and then delivered to a predetermined electronic apparatus. On the other hand, information transmitted from another apparatus via the communication line wirelessly is received by the information transceiver 23, is processed by the CPU 24, and then is displayed on the user interface 22.

Electronic Apparatus: First Information Processing Apparatus

Figure 4:
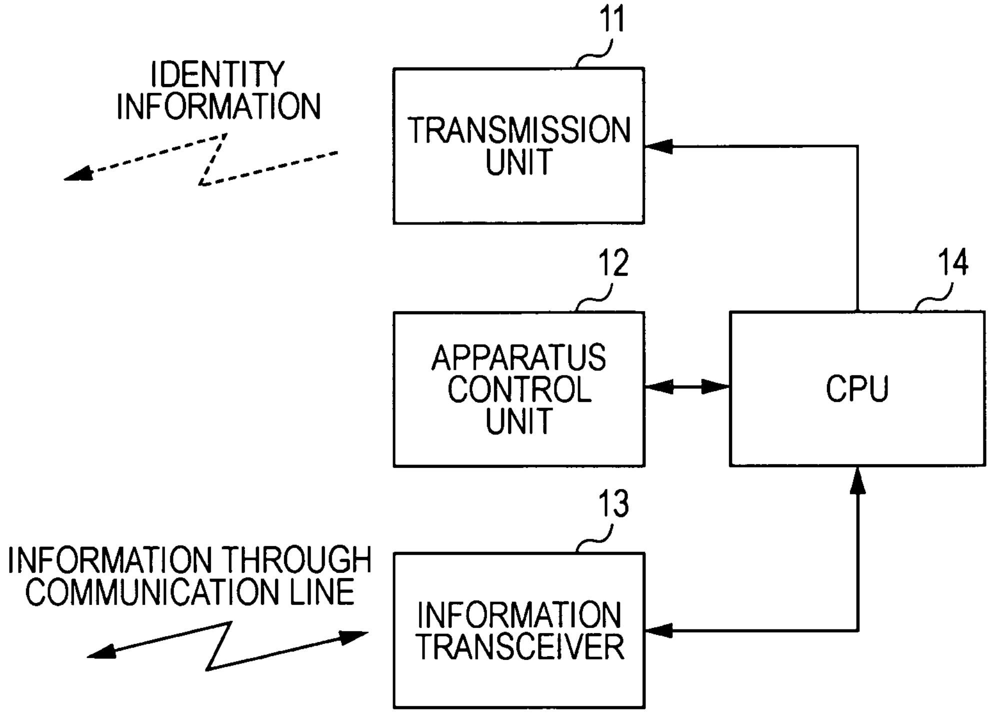
FIG. 4 is a block diagram illustrating an exemplary configuration of a first information processing apparatus serving as an electronic apparatus such as a television.

FIG. 4 is a block diagram illustrating an exemplary configuration of the first information processing apparatus which is an electronic apparatus such as a television. The first information processing apparatus includes a transmission unit 11, an apparatus control unit 12, the information transceiver 13, and a CPU (Central Processing Unit) 14.

The transmission unit 11 is a unit which transmits the identity information of the first information processing apparatus to the second information processing apparatus serving as the remote controller without passing through the communication line. The transmission unit 11 directly transmits the identity information to the second information processing apparatus by using an infrared ray, a sound, a weak radio wave, or the like as a communication medium. Accordingly, the transmission unit 11 has a configuration corresponding to the communication medium through which the identity information is transmitted. For example, when the infrared ray is used, the transmission unit 11 is configured as an infrared transmitter. When the sound is used, the transmission unit 11 is configured as a speaker. When the weak radio wave is used, the transmission unit 11 is configured as an RF transmitter.

The transmission unit 11 transmits the identity information at a predetermined time under the control of the CPU 14. For example, while power is input to the first information processing apparatus, the identity information is transmitted at a predetermined time upon normal transmission or upon connection of an apparatus to the communication line. Alternatively, the identity information may be transmitted when a request is made from the communication line wirelessly. For example, the request is sent from the second information processing apparatus serving as the remote controller.

The apparatus control unit 12 is a unit which controls the electronic apparatus in response to an instruction from the CPU 14. For example, the CPU 14 gives an instruction to the apparatus control unit 12 in response to an operation signal sent from the second information processing apparatus serving as the remote controller. In this way, the apparatus control unit 12 controls the electronic apparatus in response to the operation signal sent from the second information processing apparatus serving as the remote controller.

The information transceiver 13 is a unit which transmits and receives information to and from another apparatus via the communication line. The information transceiver 13 transmits and receives information in a wireless communication, for example. For example, the information transceiver 13 receive an operation signal sent from the second information processing apparatus serving as the remote controller via the wireless communication line and delivers the operation signal to the CPU 14. Moreover, the information transceiver 13 transmits information indicating the status of the electronic apparatus or information such as a text, an image, or a video to another apparatus (another first information processing apparatus or the second information processing apparatus) via the wireless communication line.

Another Example of Remote Controller

Figure 5A:
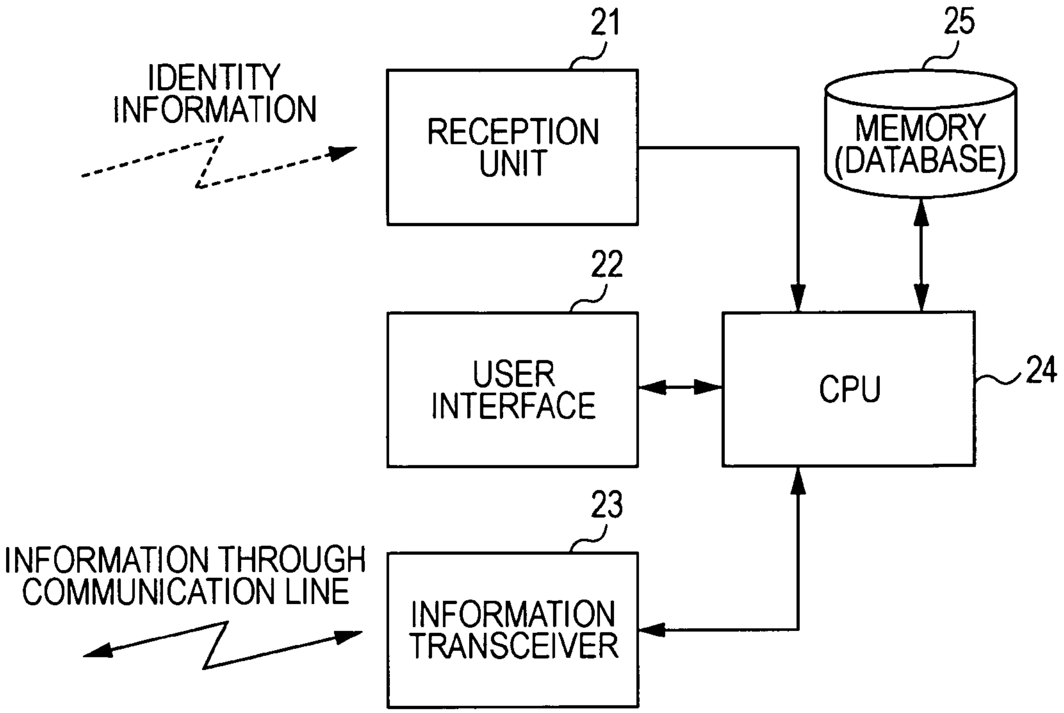
FIGS. 5A and 5B are block diagrams illustrating another exemplary example of the second information processing apparatus serving as a remote controller.
Figure 5B:
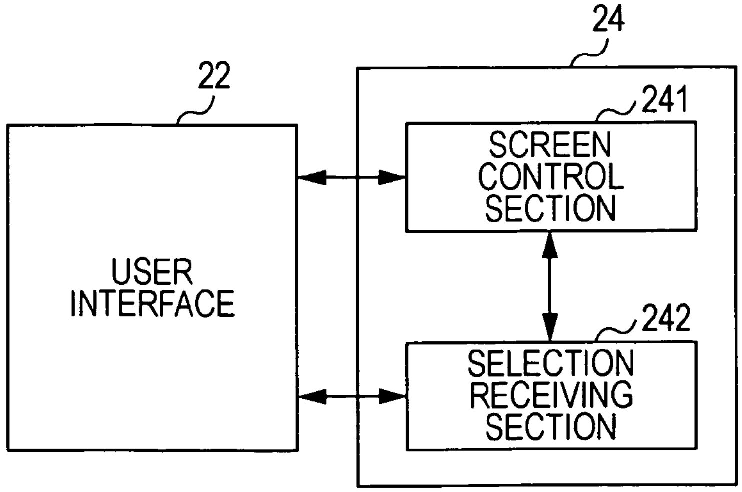

FIGS. 5A and 5B are block diagrams illustrating another exemplary configuration of the second information processing apparatus serving as the remote controller. As shown in FIG. 5A, the second information processing apparatus includes a reception unit 21, a user interface 22, an information transceiver 23, a CPU (Central Processing Unit) 24, and a memory 25.

The reception unit 21 is a unit which receives identity information transmitted from the first information processing apparatus which is an electronic apparatus. The identity information transmitted from the first information processing apparatus is transmitted through a communication medium such as an infrared ray, a sound, a weak radio wave, or the like. Accordingly, the reception unit 21 has a configuration corresponding to the communication medium through which the identity information is transmitted. For example, when the infrared ray is used, the reception unit 21 is configured as an infrared receiver. When the sound is used, the reception unit 21 is configured as a microphone. When the weak radio wave is used, the reception unit 21 is configured as an RF receiver. The identity information received by the reception unit 21 is sent to the CPU 24.

The user interface 22 is configured by operation buttons (hardware buttons) or a touch panel display. Operation buttons (software buttons) or an interface configured for an operation designation of a slide bar is displayed on the touch panel display. Moreover, the user interface 22 includes a display section configured to display various kinds of information such as a text or an image. The display of the user interface 22 is switched under the control of the CPU 24. An instruction of a user received through the user interface 22 is sent to the CPU 24.

The information transceiver 23 is a unit which transmits and receives information to and from another apparatus via the communication line. The information transceiver 23 transmits and receives information wirelessly, for example. The instruction of a user received through the user interface 22 is sent to the information transceiver 23 via the CPU 24. The instruction of the user received through the user interface 22 is transmitted to the information transceiver 23 and is transmitted to the communication line through the CPU 24 wirelessly, and then delivered to a predetermined electronic apparatus. On the other hand, information transmitted from another apparatus via the communication line wirelessly is received by the information transceiver 23, is processed by the CPU 24, and then is displayed on the user interface 22.

The memory 25 is a unit which stores screens (user interface screens) displayed on the user interface 22. The memory 25 is configured by a hard disk drive or a non-volatile memory. The memory 25 stores the user interface screens corresponding to respective identity information regarding plurality of electronic apparatuses as database.

Here, the memory 25 may be configured in various ways. For example, the following forms may be exemplified:

(1) a case in which the memory is included in the second information processing apparatus serving as the remote controller;

(2) a case in which the memory is included in the first information processing apparatus serving as the electronic apparatus;

(3) a case in which the memory is connected to the communication line; and (4) a case in which the memory is connected to an outside network (the Internets or the like).

In each case, since the memory 25 stores the user interface screens corresponding to the identity information, the memory 25 returns the user interface screen corresponding to the identity information sent from the CPU 24 to the CPU 24.

FIG. 5B is a block diagram illustrating the functions of the CPU. The CPU 24 includes a screen control section 241 and a selection receiving section 242. This configuration is realized as software executed in the CPU 24.

The screen control section 241 controls the screen displayed on the user interface 22 in response to the identity information of the first information processing apparatus received by the reception unit 21 shown in FIG. 5A. The identity information transmitted from the first information processing apparatus serves as an individual (unique) code specifying the first information processing apparatus. Accordingly, the CPU 24 specifies the first information processing apparatus by use of the identity information received by the reception unit 21 and displays the user interface screen corresponding to the specified information processing apparatus.

The user interface screen is stored in the memory 25 shown in FIG. 5A and is stored as the database corresponding to the identity information. The CPU 24 sends the user interface screen corresponding to the received identity information to the user interface 22 with reference to the database.

The selection receiving section 242 receives a selection instruction given by a user on the basis of the screen displayed on the user interface 22 and sends the selection instruction to the screen control section 241. Here, when plurality of identity information is received by the reception unit 21 shown in FIG. 5A, the screen control section 241 extracts the user interface screens corresponding to the plurality of received identity information from the memory 25 shown in FIG. 5A, and then sends the extracted user interface screens to the user interface 22. In this way, the user interface 22 is ready to display the plurality of user interface screens.

The selection receiving section 242 receives a selection instruction from the user to display a main screen among the plurality of user interface screens and sends the selection instruction to the screen control section 241. The screen control section 241 delivers the selection instruction to display the main screen among the plurality of user interface screens to the user interface 22 in response to the selection instruction sent from the selection receiving section 242. In this way, the user interface selected by the user is displayed as the main display.

3. Information Communication Method

Flow of Communication Method

Next, a flow of an information communication method according to this embodiment will be described. As shown in FIG. 1, the respective identity information of the first information processing apparatus is transmitted from the transmission unit 11 of the first information processing apparatus 10 (Television TV1 and Television TV2 in FIG. 1) connected to the communication line. The identity information is transmitted without passing through the communication line N. For example, the identity information is transmitted using an infrared ray or a sound as a communication medium.

The transmission unit 11 transmits the identity information at a predetermined time. For example, while power is input to Television TV1 and Television TV2 serving as the first information processing apparatus 10, the identity information is transmitted at a predetermined time upon normal transmission or upon connection of an apparatus to the communication line N. Alternatively, the identity information may be transmitted at a predetermined time when a request is made from the communication line N.

Subsequently, the identity information transmitted from the first information processing apparatus 10 is received by the reception unit 21 of the remote controller serving as the second information processing apparatus 20. Since the identity information is directly transmitted from the transmission units 11 of Television TV1 and Television TV2 serving as the first information processing apparatus 10 without passing through the communication line N, the reception unit 21 of the remote controller serving as the second information processing apparatus 20 receives the identity information in a predetermined range.

Here, when the identity information is transmitted using an infrared ray as the communication medium, for example, the remote controller receives the identity information only in the communication range of the infrared ray. Accordingly, when Television TV1 and Television TV2 are installed in separate rooms, for example, the remote controller receives only the identity information of the televisions installed in the same room. This is because the identity information transmitted from the television installed in another room may not be received since the infrared ray is used as the communication medium.

Subsequently, the remote controller serving as the second information processing apparatus 20 transmits predetermined information to the first information processing apparatus 10 by use of the identity information received by the reception unit 21. At this time, the information transceiver of the remote controller serving as the second information processing apparatus 20 buries the identity information received by the reception unit 21 in the information to be transmitted, and then transmits the information to the communication line N.

By burying the identity information in the information to be transmitted, the first information processing apparatus 10 connected to the communication line N detects and receives the information designed to be transmitted to the first information processing apparatus. In this way, the remote controller serving as the second information processing apparatus 20 transmits information regarding operation control or the like corresponding to the received identity information to the television serving as the first information processing apparatus 10 in order to carry out a remote operation.

Specific Example

Next, a specific example of an information communication method according to this embodiment will be described. Here, an example in which an apparatus is mounted using UPnP (Universal Plug and Play: trademark of UPnP Implementers Corporation) will be described as the specific example.

In UPnP, device description about section 3 of a basic device shown in FIG. 6 is made and used in searching an apparatus corresponding to UPnP on a network. The device description includes uuid which is a global unique ID.

In this embodiment, Television TV1 and Television TV2 serving as the first information processing apparatus 10 shown in FIG. 1 each transmit uuid in a communication way of an infrared ray. Then, the remote controller serving as the second information processing apparatus 20 receives respective uuid transmitted from Television TV1 and TV2.

In the example shown in FIG. 1, the remote controller serving as the second information processing apparatus 20 can receive the infrared ray of Television TV1, since the remote controller is located in Room A. However, the remote controller may not receive the infrared ray of Television TV2 located in Room B. As a consequence, the remote controller receives uuid of Television TV1. For example, when uuid of Television TV1 is a value of "xyz", the remote controller sets the uuid of the remote controller to "xyzController" and transmits the uuid of the remote controller to the communication line N. That is, uuid of the remote controller is set to have received uuid of Television TV1.

Television TV1 and Television TV2 serving as the first information processing apparatus 10 find the remote controller serving as the second information processing apparatus 20 by searching apparatuses on the communication line N. However, the remote controller detects that Television TV1 is associated with the remote controller. That is, referring to uuid of the device description, it may be understood that uuid of Television TV1 is contained in uuid of the remote controller. In this way, the remote controller grasps that Television TV1 is associated with the remote controller.

Television TV1 acquires information transmitted to Television TV1 via the communication line N to execute an information process. The remote controller serving as the second information apparatus 20 transmits a control signal for Television TV1, of which uuid is acquired, to Television TV1 via the communication line N. Therefore, the remote controller controls Television TV1 on the assumption that Television TV1 acquires the control signal. On the other hand, since Television TV2 understands that Television TV2 is not associated with the control signal transmitted from the remote controller, Television TV2 dos not receive the control signal from the remote controller.

4. Information Communication Program

Next, an information communication program according to this embodiment will be described. The information communication program according to this embodiment has steps executed in a computer. The computer includes a calculation unit executing the information communication program according to this embodiment, a memory storing programs and various kinds of data, and an input/output unit. The computer may be embedded in an electronic computer such as a personal computer as well as the electronic apparatus serving as the first information processing apparatus 10 and the remote controller serving as the second information processing apparatus 20. The information communication program according to this embodiment is recorded in a record medium such as a CD-ROM or may be supplied via a network.

Figure 7:
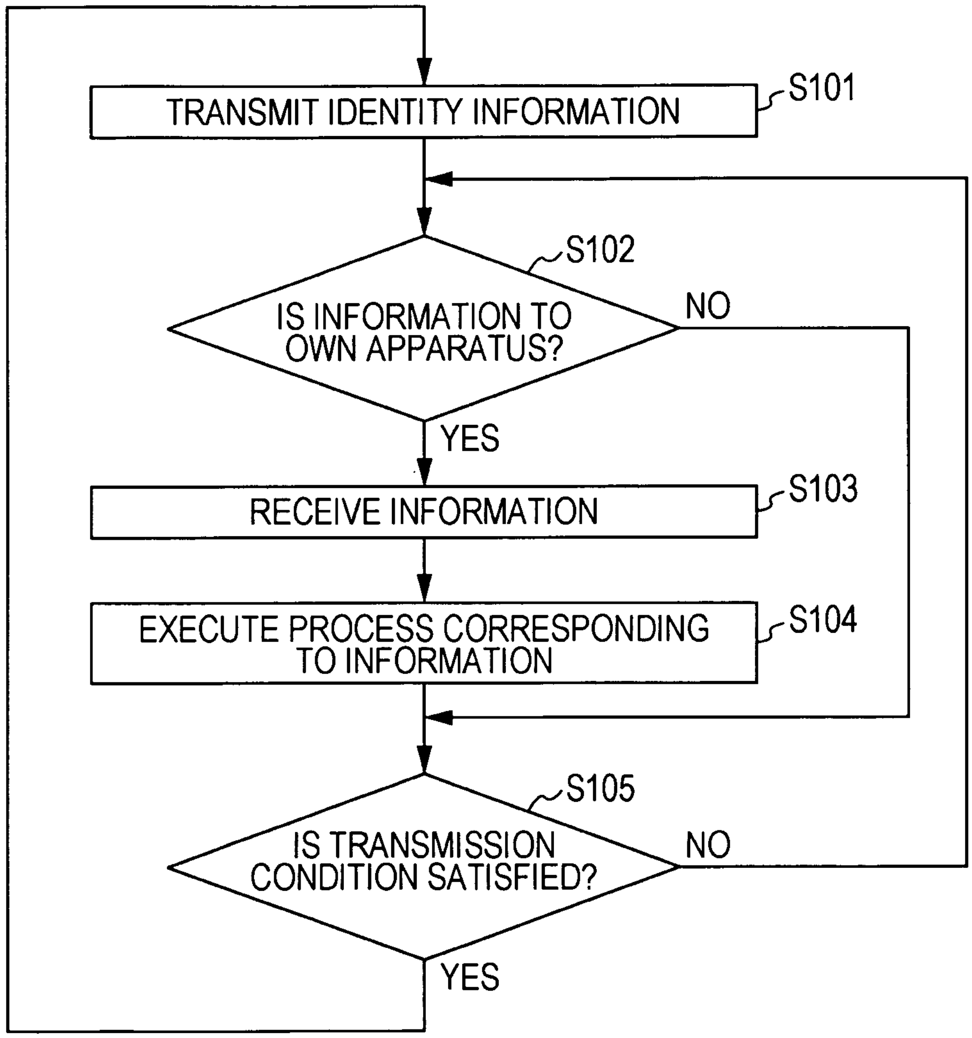
FIG. 7 is a flowchart illustrating an information communication program in the electronic apparatus serving as the first information processing apparatus.

Electronic Apparatus: Information Communication Program in First Information Processing Apparatus FIG. 7 is a flowchart illustrating the information communication program in the electronic apparatus serving as the first information processing apparatus. First, the electronic apparatus (for example, a television) serving as the first information processing apparatus transmits uuid as the identity information of the first information processing apparatus (step S101). Here, the transmission unit transmits uuid through the communication medium such as an infrared ray or a sound without passing through the communication line to which the first information processing apparatus is connected.

Subsequently, the first information processing apparatus determines whether information is transmitted to the individual apparatus via the communication line (step S102). When the information is transmitted to the individual apparatus (step S103), a process corresponding to the received information is executed (step S104).

Alternatively, when the information is not transmitted to the individual apparatus, it is determined whether to satisfy a transmission condition of uuid serving as the identity information (step S105). The transmission condition is set in advance. For example, while power is input, a normal transmission condition, a condition where information is transmitted at a predetermined time, a condition where the information is transmitted upon receiving a request from the outside such as a communication line, and the like may be set. When the transmission condition is satisfied, uuid serving as the identity information is transmitted (step S101). Alternatively, when the transmission condition is not satisfied, uuid is not transmitted and the process turns to the step of determining whether information is transmitted to the own apparatus via the communication line (step S102). These steps are repeated while power is input to the first information processing apparatus.

Figure 8:
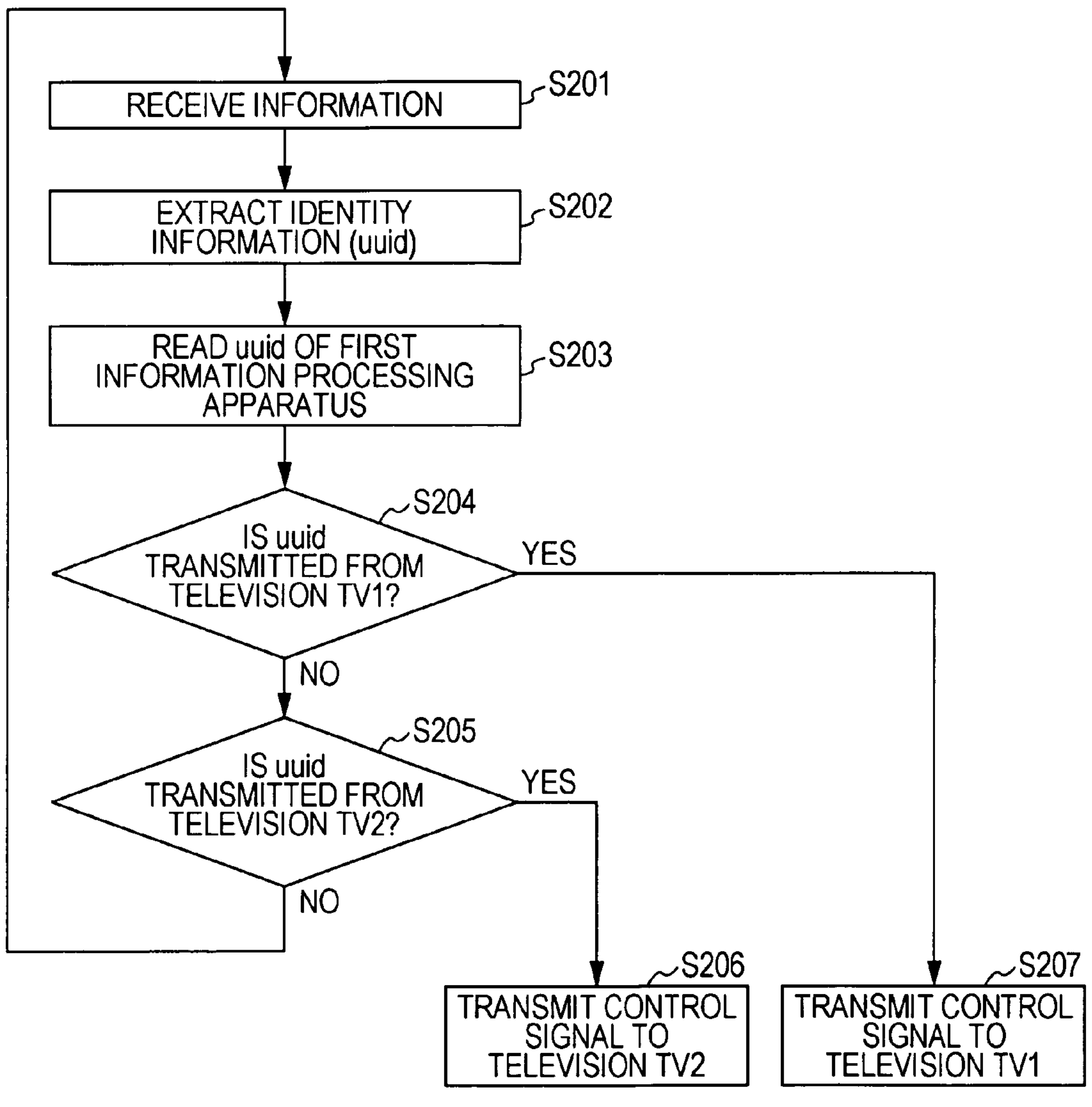
FIG. 8 is a flowchart illustrating an information communication program in the remote controller serving as the second information processing apparatus.

Remote Controller: Information Communication Program in Second Information Processing Apparatus FIG. 8 is a flowchart illustrating an information communication program in the remote controller serving as the second information processing apparatus. First, the remote controller serving as the second information processing apparatus receives a signal (an infrared ray, sound, or the like) transmitted from the above-described transmission unit of the first information processing apparatus (step S201). Subsequently, uuid serving as the identity information is extracted from the received signal (step S202). Subsequently, uuid serving as the extracted identity information is read from the information on the communication line to recognize that the first information processing apparatus serving as a transmission source of uuid is connected to the communication line (step S203).

Subsequently, from the received identity information, it is determined which kind of apparatus the first information processing apparatus is (steps S204 and S205). In this embodiment, since two Television TV1 and Television TV2 serving as the first information processing apparatus are connected to the communication line, the remote controller determines whether the received uuid is transmitted from Television TV1 or Television TV2. Here, when the electronic apparatus connected to the communication line is determined from received uuid, display may be executed for confirmation. In this way, the user confirms the screen of the electronic apparatus which is an operation target determined by the remote controller.

When received uuid is transmitted from Television TV1, the information transceiver of the remote controller transmits a control signal to Television TV1 via the communication line (step S206). Alternatively, when received uuid is transmitted from Television TV2, the information transceiver of the remote controller transmits a control signal to Television TV2 via the communication line (step S207).

Display of User Interface Screen

Figure 9:
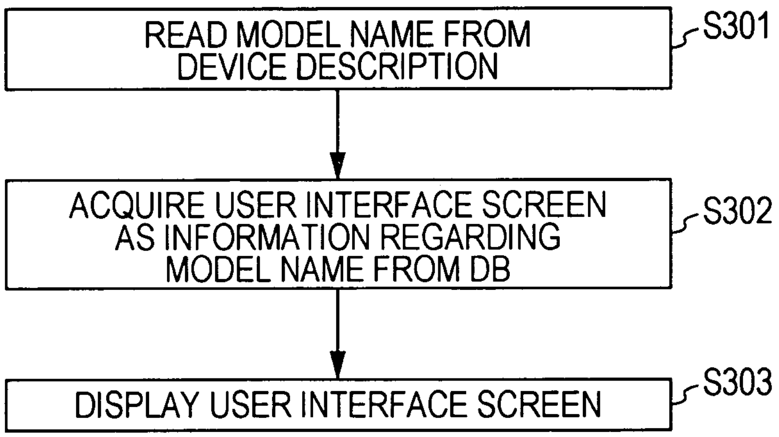
FIG. 9 is a flowchart illustrating a display program of a user interface screen in the remote controller serving as the second information processing apparatus.

FIG. 9 is a flowchart illustrating a display program of a user interface screen in the remote controller serving as the second information processing apparatus. The display program is executed in a screen control section of the CPU shown in FIG. 5B.

First, a model name is read from the device description of UPnP containing the identity information uuid transmitted from the electronic apparatus (for example, a television) serving as the first information processing apparatus (step S301). Here, the model name is one of the identity information in this embodiment.

Subsequently, the model name is used as information and the user interface screen corresponding to the model name is acquired from the database (step S302). The database is stored in the memory shown in FIG. 5A. The database is stored so that the user interface screen corresponds to the identity information.

Subsequently, the acquired user interface screen is displayed on the display section (user interface) of the remote controller (step S303). In the above-described display program, the user interface screen corresponding to the model name of the device description is acquired and displayed. However, the corresponding user interface screen may be acquired from the identity information uuid used to determine the kind of electronic apparatus and may be displayed.

Here, when the user interface screen corresponding to the model name is stored, one user interface screen may be stored for an apparatus having the same function, even when the apparatus has different uuid. Therefore, the memory size of the database can be reduced. On the other hand, when the user interface screen corresponding to uuid is stored, different user interface screens may be stored for every uuid, even when an apparatus has the same function. Therefore, a user stores user interface screens of which the specification is changed by the user in every apparatus (every uuid), for example, and thus the display of the user interface screen can be executed in accordance with user preference.

5. Screen Display Examples

Screen Display Example 1

Figure 10A:
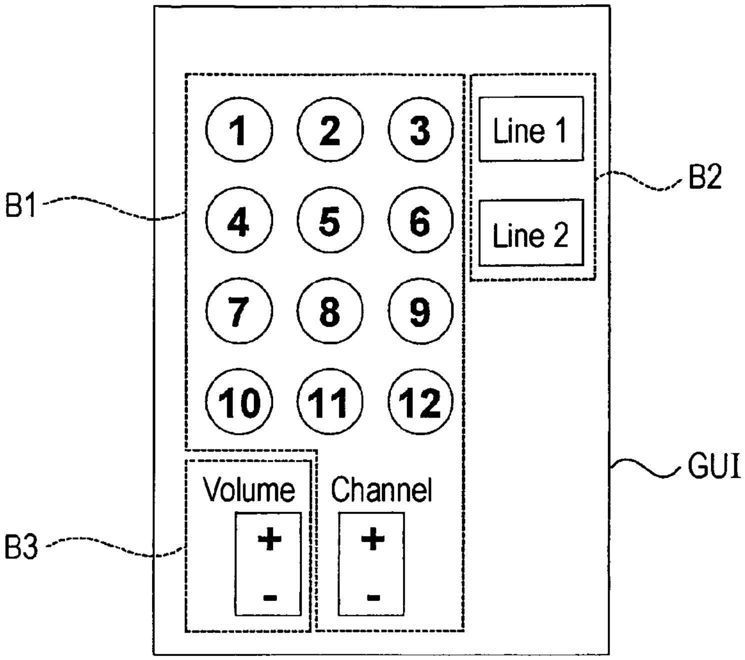
FIGS. 10A and 10B are diagrams illustrating a display example (Example 1) of the user interface screen of the remote controller serving as the second information processing apparatus.
Figure 10B:
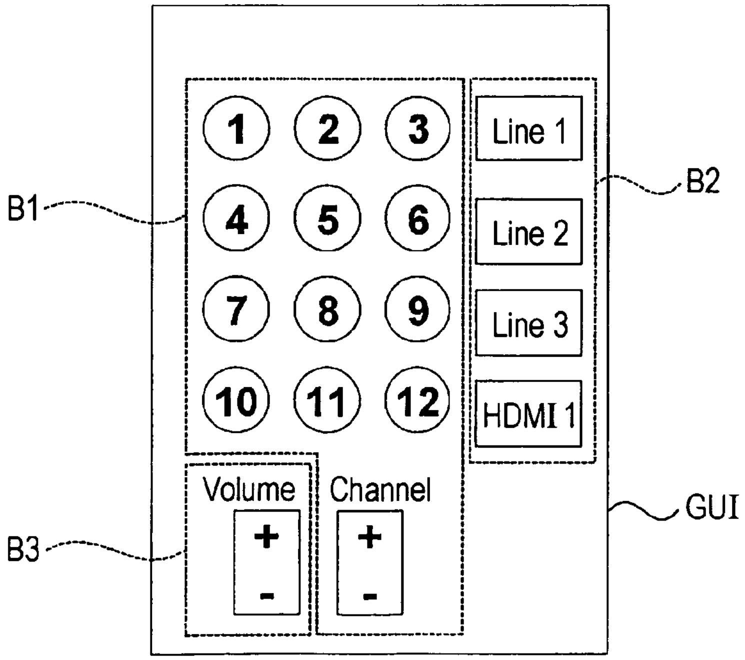

FIGS. 10A and 10B are diagrams illustrating a display example (Example 1) of the user interface screen of the remote controller serving as the second information processing apparatus. The remote controller serving as the second information apparatus displays the user interface screen corresponding to the received identity information of the first information processing apparatus. For example, on the user interface screen of the television, channel selection B1, input selection B2, and button B3 for volume setting shown in FIGS. 10A and 10B are displayed as software buttons. On the screen display of the buttons, the screen position and the function of each button correspond to each other. Therefore, when a button is selected on the screen, the function (control signal) corresponding to the position of the button is sent to the television.

The remote controller reads a user interface screen GUI corresponding to the received identity information shown in FIG. 10A or 10B from the memory and displays the read user interface screen GUI on the user interface.

Screen Display Example 2

Figures 11A, 11B:
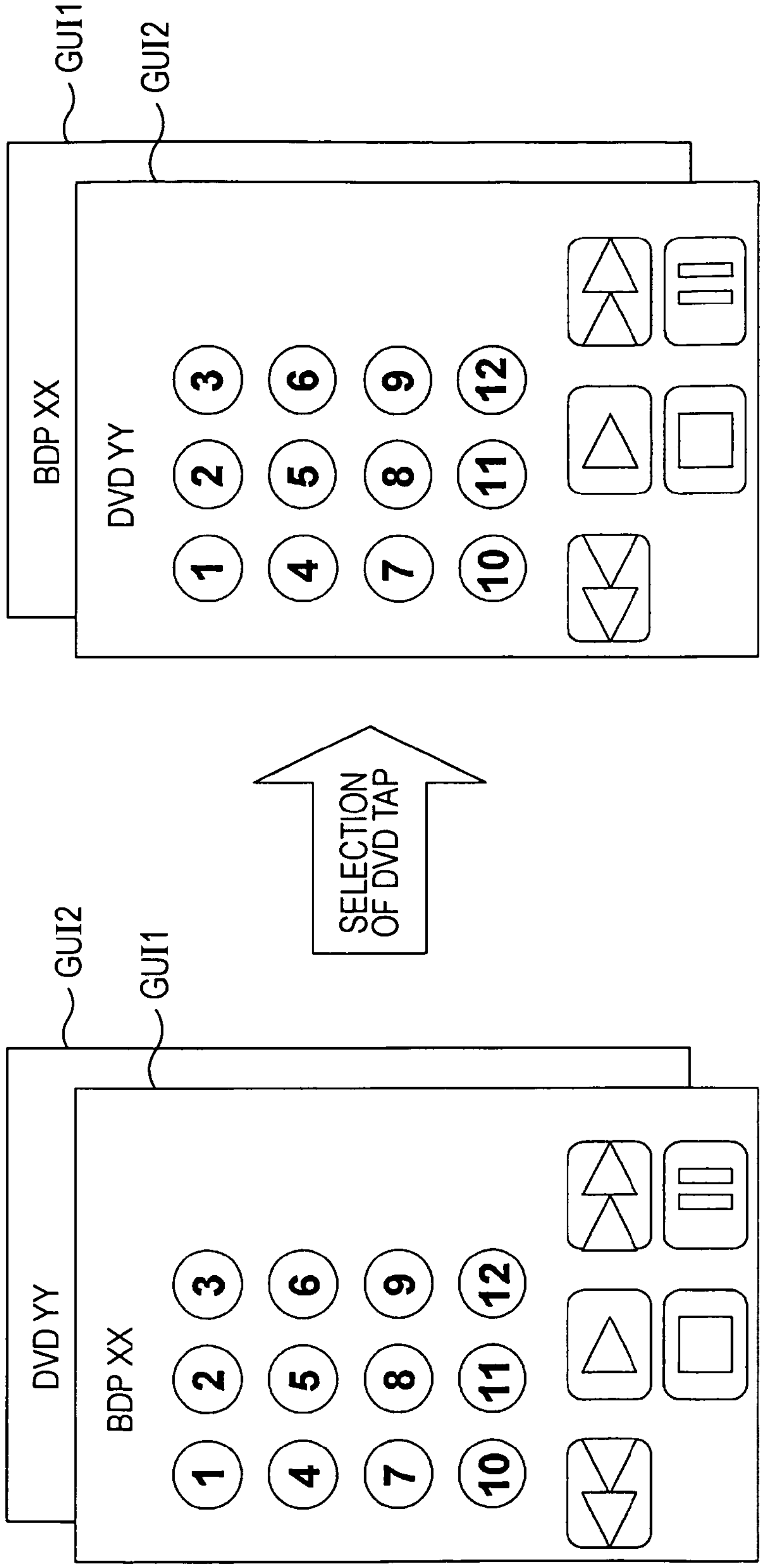
FIGS. 11A and 11B are diagrams illustrating a display example (Example 2) of the user interface screen of the remote controller serving as the second information processing apparatus.

FIGS. 11A and 11B are diagrams illustrating a display example (Example 2) of the user interface screen of the remote controller serving as the second information processing apparatus. The screen display is a display example where the reception unit of the remote controller serving as the second information processing apparatus receives the plurality of identity information. For example, when a plurality of electronic apparatuses (a television, an image record reproducing apparatus, and the like) is installed in the same room, the reception unit receives the plurality of identity information. This display screen is the display example of this case.

When the reception unit of the remote controller serving as the second information processing apparatus receives the plurality of identity information, the screen control section shown in FIG. 5B reads user interface screens GUI1 and GUI2 corresponding to the respective identity information. The plurality of read user interface screens GUI1 and GUI2 are displayed in an overlapping manner, for example, as shown in FIGS. 11A and 11B.

The reception unit of the remote controller receives two pieces of identity information, and the two user interface screens GUI1 and GUI2 corresponding to the identity information are shown in the overlapping manner in FIGS. 11A and 11B. When the plurality of user interface screens GUI1 and GUI2 are displayed in the overlapping manner, the upper and lower user interface screens GUI1 and GUI2 are displayed at slightly deviated positions in the overlapping manner, and thus it may be understood that the user interface screens GUI1 and GUI2 sequentially overlap with each other. When the user interface screens GUI1 and GUI2 are displayed at the deviated positions, information regarding the model name of the first information processing apparatuses corresponding to the user interface screens GUI1 and GUI2 is shown so as to specify the electronic apparatuses.

The order in which the plurality of user interface screens GUI1 and GUI2 overlap with each other is set under a predetermined condition. For example, the user interface screens GUI1 and GUI2 overlap with each other from the above side in descending order of the reception strength when the reception unit receives the identity information. Alternatively, the user interface screens GUI1 and GUI2 overlap with each other from the above side in chronological order in which the reception unit receives the identity information later. The user interface screen GUI1 or GUI2 displayed at the topmost position of the overlapping display is a main display.

The main display is switched by a predetermined selection operation of a user among the plurality of user interface screens GUI1 and GUI2 displayed in the overlapping manner. For example, when the user selects (screen-contacts) a part of the display region of the user interface screen GUI2 displayed on the lower side on the overlapping display shown in FIG. 11A, the selected user interface screen GUI2 on the lower side is switched to the topmost main display, as in FIG. 11B.

The selection of this screen is received by the selection receiving section shown in FIG. 5B. That is, when the selection receiving section receives the selection operation of the user in a contact manner or the like, the selection receiving section selects the user interface screen GUI1 or GUI2 displayed at the selected position and delivers the selected screen to the screen control section shown in FIG. 5B. The screen control section switches the position of the selected user interface screen GUI1 or GUI2 to the topmost position in response to an instruction of the selection receiving section.

The user interface screen GUI1 or GUI2 displayed on the topmost position of the screen becomes the main display and the first information processing apparatus corresponding to the user interface screen GUI1 or GUI2 becomes the operation target apparatus. That is, the operation of selecting the operation target apparatus among the plurality of apparatuses is executed in such a manner that the user selects the user interface screen GUI1 or GUI2 corresponding to the operation target apparatus and switches the main display.

In the display example of the user interface screen shown in FIGS. 11A and 11B, the plurality of user interface screens GUI1 and GUI2 are displayed in the overlapping manner. However, the plurality of user interface screens GUI1 and GUI2 may be displayed in parallel or vertically.

Screen Display Example 3

Figures 12A, 12B:
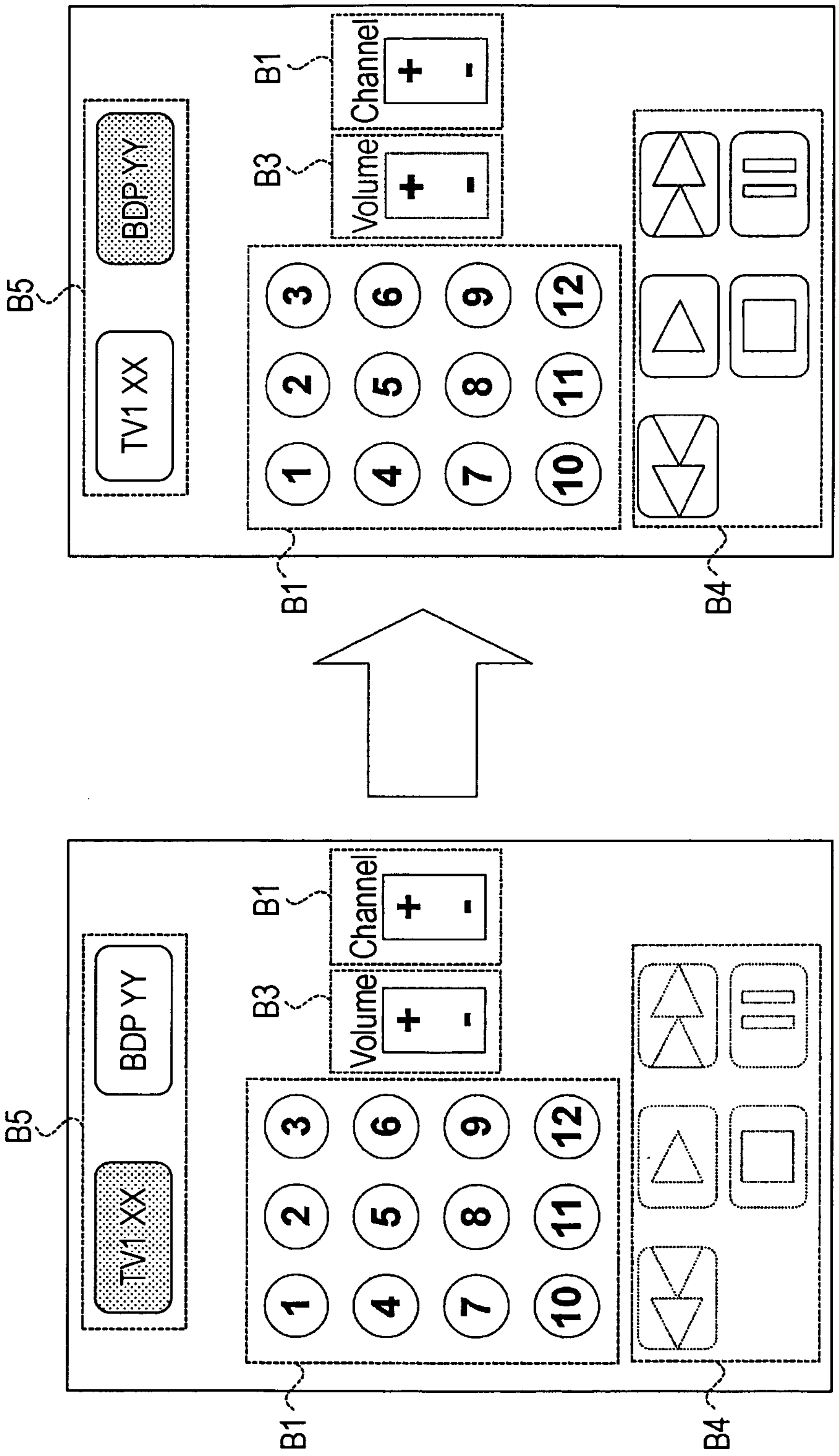
FIGS. 12A and 12B are diagrams illustrating a display example (Example 3) of the user interface screen of the remote controller serving as the second information processing apparatus.

FIGS. 12A and 12B are diagrams illustrating a display example (Example 3) of the user interface screen of the remote controller serving as the second information processing apparatus. This screen display is a display example where the reception unit of the remote controller serving as the second information processing apparatus receives a plurality of identity information. In this display example, when the reception unit of the remote controller serving as the second information processing apparatus receives the plurality of identity information, the user interface screens corresponding to the plurality of identity information is combined and thus one user interface screen is displayed.

The combination of the user interface screens is executed by the screen control section shown in FIG. 5B or a screen combining section (not shown) (which has a configuration realized by a program executed in the CPU). For example, the combination of the user interface screens is realized by a logic sum of the buttons of the plurality of user interface screens read from the database of the memory on the basis of the plurality of identity information. That is, common buttons of the plurality of user interface screens are combined so as to be laid out as one button and individual buttons thereof are combined so as to be separately laid out.

The example shown in FIGS. 12A and 12B is displayed by receiving the respective identity information of the television and the image record reproducing apparatus and combining the user interface screens corresponding to the respective identity information. For example, a common channel selection button B1 of the television and the image record reproducing apparatus is laid out as one button. A volume button B3 formed only in the television and an operation buttons B4, which includes a play button, a record button, a forward button, a rewind button, and a pause button, are separately laid out.

A selection button B5 of the electronic apparatuses associated with the combination is newly laid out on the combined user interface screen. The operation target apparatus is selected on the combined user interface screen by operating the selection button B5 of the electronic apparatuses.

FIG. 12A shows that the selection button B5 of the television is selected. The initial selection may be executed in accordance with the reception strength or the reception time of the identity information. When the selection button B5 of the television is selected, the television is determined as the operation target apparatus on the user interface screen. At this time, the necessary button and the unnecessary button may be displayed differently in the operation of the television. Alternatively, only the button necessary for the operation of the television may be selected and the unnecessary button may not be selected. In this way, the user can easily grasp the necessary button in the operation of the selected electronic apparatus and can avoid selecting the unnecessary button.

On the user interface screen shown in FIG. 12A, the necessary buttons (for example, the channel selection button B1 and the volume button B3) used to operate the television are normally displayed and become a selection state (where the button responds to the selection). On the contrary, the unnecessary button (for example, the operation button B4) in the operation of the television is displayed with gray and becomes a non-selection state (where the button does not respond to the selection).

In this state, when the user selects the selection button B5 of the image record reproducing apparatus, the switch to the user interface screen shown in FIG. 12B is executed. When the user interface screen is switched, the necessary buttons (for example, the channel selection button B1 and the operation button B4) used to operate the image record reproducing apparatus are normally displayed and become a selection state (where the button responds to the selection). On the contrary, the unnecessary button (for example, the volume button B3) in the operation of the image record reproducing apparatus is displayed with gray and becomes a non-selection state (where the button does not respond to the selection).

The above-described screen display examples (Examples 1 to 3) have been described, but the plurality of user interface screens may be displayed in various types. The various display forms may be configured so as to be changed by a switch button (not shown) determined by setting in accordance with the preference of the user.

It should be understood by those skilled in the art that various modifications, combinations, sub-combinations and alterations may occur depending on design requirements and other factors insofar as they are within the scope of the appended claims or the equivalents thereof.

What is claimed is:

1. An information communication system comprising:

a communication line which connects a first information processing apparatus and a second information processing apparatus to each other;

a transmission unit which is included in the first information processing apparatus and transmits identity information of the first information processing apparatus without passing through the communication line;

a reception unit which is included in the second information processing apparatus and receives the identity information of the first information processing apparatus transmitted from the transmission unit without passing through the communication line; and an information transmission unit which is included in the second information processing apparatus and transmits second information to the first information processing apparatus via the communication line by using the identity information received by the reception unit, in which the identity information of the first information processing apparatus is transmitted by the transmission unit included in the first information processing apparatus by way of a communication medium which is different from that associated with the communication line so that transmission of the identity information by the transmission unit included in the first information processing apparatus is not by way of the communication line, in which the second information transmitted by the information transmission unit included in the second information processing apparatus to the first information processing apparatus is transmitted via the communication line such that transmission of the second information is not by way of the communication medium, in which the second information processing apparatus includes a screen control section which controls display of a display screen in response to receipt by the reception unit of the identity information of each of a number of first information processing apparatus such that when the reception unit receives a plurality of identity information from a plurality of first information processing apparatus the screen control section causes a plurality of interface screens to be displayed in an overlapping manner in a predetermined order on the display screen, said predetermined order being a chronological order based on when the reception unit receives the identity information of each of the plurality first information processing apparatus or a reception strength order based on a respective reception strength of the identity information of each of the plurality first information processing apparatus when received by the reception unit.

2. The information communication system according to claim 1, wherein the second information processing apparatus includes a selection receiving section which receives a selection instruction to display a main screen from among the plurality of interface screens displayed by the screen control section.

3. The information communication system according to claim 1, wherein the communication medium is an optical communication medium.

4. The information communication system according to claim 1, wherein the communication medium is an acoustic communication medium.

5. An information processing apparatus comprising:

a reception unit which receives identity information of another information processing apparatus transmitted from the another information processing apparatus connected via a communication line without passing through the communication line;

an information transmission unit which transmits second information to the another information processing apparatus via the communication line by using the identity information received by the reception unit; and a screen control section which controls display of a display screen in response to receipt by the reception unit of the identity information of each of a number of said another information processing apparatus such that when the reception unit receives a plurality of identity information from a plurality of said another information processing apparatus the screen control section causes a plurality of interface screens to be displayed in an overlapping manner in a predetermined order on the display screen, said predetermined order being a chronological order based on when the reception unit receives the identity information of each of the plurality first information processing apparatus or a reception strength order based on a respective reception strength of the identity information of each of the plurality first information processing apparatus when received by the reception unit, in which the identity information of the another information processing apparatus is transmitted by the another information processing apparatus by way of a communication medium which is different from that associated with the communication line so that transmission of the identity information by the another information processing apparatus is not by way of the communication line, and in which the second information transmitted by the information transmission unit to the another information processing apparatus is transmitted via the communication line such that transmission of the second information is not by way of the communication medium.

6. A non-transitory computer readable medium having stored thereon an information communication program causing a computer to execute:

a transmitting step of permitting a first information processing apparatus connected via a communication line to transmit identity information of the first information processing apparatus without passing through the communication line;

a receiving step of permitting a second information processing apparatus connected via the communication line to receive the identity information transmitted from the first information processing apparatus in the transmitting step without passing through the communication line;

an information transmitting step of transmitting second information to the first information processing apparatus via the communication line by using the identity information received in the receiving step; and a control displaying step of controlling a display screen in response to receipt of the identity information of each of a number of first information processing apparatus such that when a plurality of identity information are received from a plurality of first information processing apparatus a plurality of interface screens are caused to be displayed in an overlapping manner in a predetermined order on the display screen, said predetermined order being a chronological order based on when the reception unit receives the identity information of each of the plurality first information processing apparatus or a reception strength order based on a respective reception strength of the identity information of each of the plurality first information processing apparatus when received by the reception unit, in which the identity information of the first information processing apparatus is transmitted by the first information processing apparatus by way of a communication medium which is different from that associated with the communication line so that transmission of the identity information by the first information processing apparatus is not by way of the communication line, and in which the second information is transmitted to the first information processing apparatus via the communication line such that transmission of the second information is not by way of the communication medium.

7. An information communication method comprising the steps of:

transmitting identity information of a first information processing apparatus from a transmission unit of the first information processing apparatus connected to a communication line without passing through the communication line;

receiving the identity information transmitted from the transmission unit of the first information processing apparatus without passing through the communication line by a reception unit of a second information processing apparatus;

transmitting second information from an information transmitting unit of the second information processing apparatus to the first information processing apparatus via the communication line by using the identity information received by the reception unit of the second information processing apparatus; and controlling display of a display screen by a screen control section in response to receipt by the reception unit of the identity information of each of a number of said first information processing apparatus such that when the reception unit receives a plurality of identity information from a plurality of said first information processing apparatus the screen control section causes a plurality of interface screens to be displayed in an overlapping manner in a predetermined order on the display screen, said predetermined order being a chronological order based on when the reception unit receives the identity information of each of the plurality first information processing apparatus or a reception strength order based on a respective reception strength of the identity information of each of the plurality first information processing apparatus when received by the reception unit, in which the identity information of the first information processing apparatus is transmitted by the first information processing apparatus by way of a communication medium which is different from that associated with the communication line so that transmission of the identity information by the first information processing apparatus is not by way of the communication line, and in which the second information is transmitted to the first information processing apparatus via the communication line such that transmission of the second information is not by way of the communication medium.

* * * * *